United States Patent [19]

Taysom et al.

[15] 3,646,810

[45] Mar. 7, 1972

[54] CANTILEVERED SPRING PRESSURE MEASUREMENT AND ADJUSTMENT

[72] Inventors: Patrick Arnold Taysom, Tonbridge, Kent; Brian Mark Lewis, Winchmore Hill, London; Clive Francis Kittel, Pinner, Middlesex, all of England

[73] Assignee: International Standard Electric Corporation, New York, N.Y.

[22] Filed: July 8, 1969

[21] Appl. No.: 60,782

[30] Foreign Application Priority Data

July 10, 1968 Great Britain......................32,910/68

[52] U.S. Cl.................................................73/161, 73/100
[51] Int. Cl...........................................................G01l 5/00
[58] Field of Search..........................................73/161, 100

[56] References Cited

UNITED STATES PATENTS 2,789,430   4/1957   Sinclaire..................................73/161
3,282,096   11/1966  Bullard....................................73/161
2,003,910   6/1935   Stephenson..............................73/161
1,615,117   1/1927   Emery......................................73/161

Primary Examiner—Louis R. Prince
Assistant Examiner—Denis E. Corr
Attorney—C. Cornell Remsen, Jr., Walter J. Baum, Paul W. Hemminger, Percy C. Lantzy, Philip M. Bolton, Isidore Togut and Charles L. Johnson, Jr.

[57] ABSTRACT

Apparatus for automatic measurement of the pressure provided by a cantilevered spring against a restraint and for the adjustment of said pressure to within desired limits. A probe is pressed against said spring lifting it from its restraint and the amount of force applied by the probe to lift the spring from its restraint is measured. If this measured force is not within predetermined limits, a bifurcated member is placed about the spring near the support from which it is cantilevered and said bifurcated member rotates so as to deform the spring in a direction such that the spring pressure will be within desired limits.

12 Claims, 5 Drawing Figures

Inventors
PATRICK A. TAYSOM
BRIAN M. LEWIS
CLIVE F. KITTEL
By
Herbert Stern
Attorney

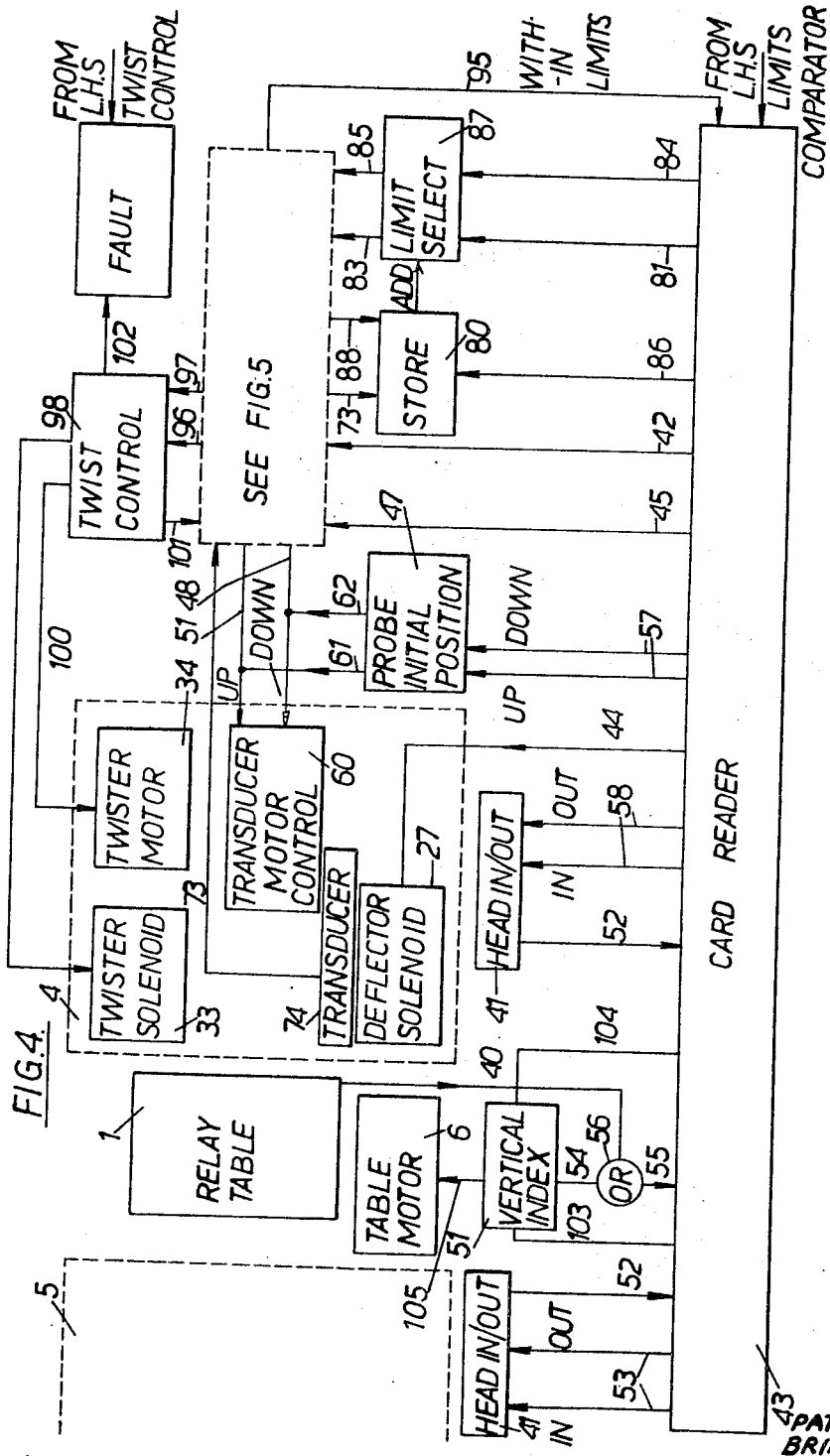

3,646,810

CANTILEVERED SPRING PRESSURE MEASUREMENT AND ADJUSTMENT

BACKGROUND OF THE INVENTION

The invention relates to the automatic measurement of the force applied by a spring and, although basically the invention is applicable to a variety of different kinds of springs or sprung members (hereinafter collectively referred to as sprung members), the invention is especially concerned with cantilever springs such as the contact springs of a relay. In all cases, however, the spring in question is not entirely relaxed but presses against a seating or other form of restraint, the invention being concerned with the measurement of the force required to lift the spring or sprung member from its restraint, and with the adjustment of the spring to bring this force to within desired limits.

In a cantilever spring the force required at any point along the length of the spring to deflect it increases as the point of application of the force approaches the support from which the spring is cantilevered. In the present specification the force applied at any point along the length of a cantilever spring to lift the spring off its restraint is defined as the spring pressure of the spring at that point. Usually the point considered is adjacent the free end of the spring and adjacent, in the case of a relay spring, the contacts.

SUMMARY OF THE INVENTION

According to its broadest aspect, the invention provides a machine for automatically measuring the force required to lift a sprung member from a restraint, the machine including a support head, a probe coupled to said support head, means coupled to said probe for moving the probe in a direction so as to press the sprung member from its restraint, sensing means coupled to said probe for determining that said sprung member has left its restraint, measuring means for determining the force exerted on the probe by the sprung member and generating means for providing a signal which is a function of the force exerted on the probe by the sprung member at the time said sprung member leaves its restraint.

An embodiment of the invention will now be described, by way of example, with reference to the accompanying drawings, in which:

BRIEF DESCRIPTION OF THE DRAWINGS

FIG. 4 is a block schematic of the control circuitry to be used with the machine of FIG. 2.

DESCRIPTION OF THE PREFERRED EMBODIMENT

Figure 1:
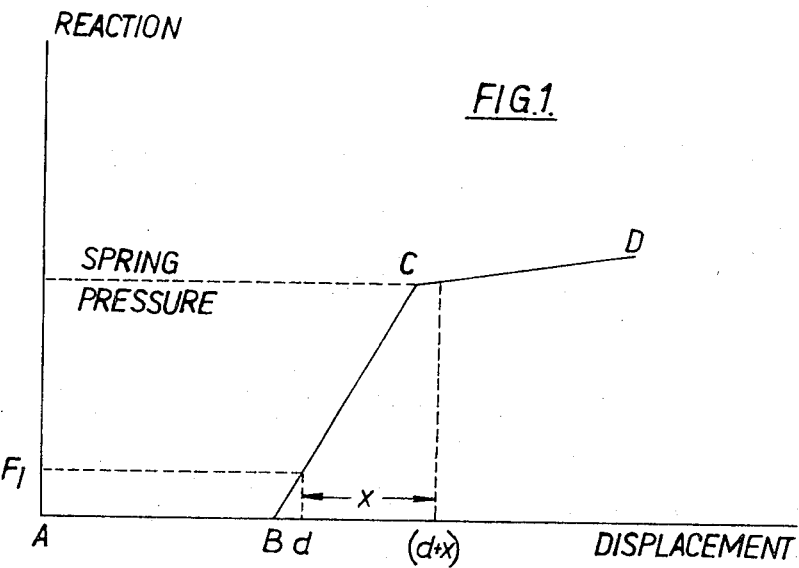
FIG. 1 is a force-displacement graph helpful in explaining the principle upon which the measurement of spring pressure is based.

Referring to FIG. 1, there is shown a graph indicating the force of reaction of a cantilever spring on a member as the latter is moved in the direction of normal deflection of the spring into contact with the spring at a specified point along its length. The spring is assumed to initially bear against a restraint which prevents it adopting an unrestrained neutral position, the member being moved until the spring leaves the restraint.

As the member moves toward the spring, at position A, out of contact with the spring, there will be no force on the member. At B the member first makes contact with the spring, and, as the member continues to move, the force will increase rapidly. At point C the member has continued its movement until the spring is just clear of its restraint. As the member continues its travel, carrying the spring with it, the force will continue to increase, but now more slowly, as the deflection of the spring increases. Ideally the portion BC of the curve would be vertical. In practice there is bound to be some distortion of the spring and/or of the member so that the spring does not completely leave its seating immediately the point B is reached. The force measured for the displacement C is, by definition, the spring pressure at the point of measurement along the length of the spring. With different kinds of springs, the exact shape of the force-displacement curve will also differ. However, there is an abrupt discontinuity in the rate of change of force at B and another at C.

In the machine to be described the spring is moved by a probe carried by a transducer which is many times stiffer than the spring and which gives an electrical output proportional to the force experienced by the probe. The transducer is moved at constant speed towards the spring to cause the probe to lift the spring from its restraint, the output of the transducer being monitored by an electrical circuit. With the probe advancing at constant speed the circuit first detects when the output of the transducer exceeds that corresponding to a force $F_1$ at a position $d$ close to B along BC. This detection is used as a reference, whereupon a signal is generated by the circuit when it detects the first abrupt discontinuity in $dF/dx$ thereafter, at C. This is achieved by a differentiating circuit which monitors $dF/dt$ which is proportional to $dF/dx$ since the probe is moved at constant speed. Alternatively, after the reference detection, the probe is moved through a predetermined distance $x$ to a point just beyond C, the force then exerted on the probe being taken as the sprung pressure. Examples of both methods of measurement will be given.

Figure 2:
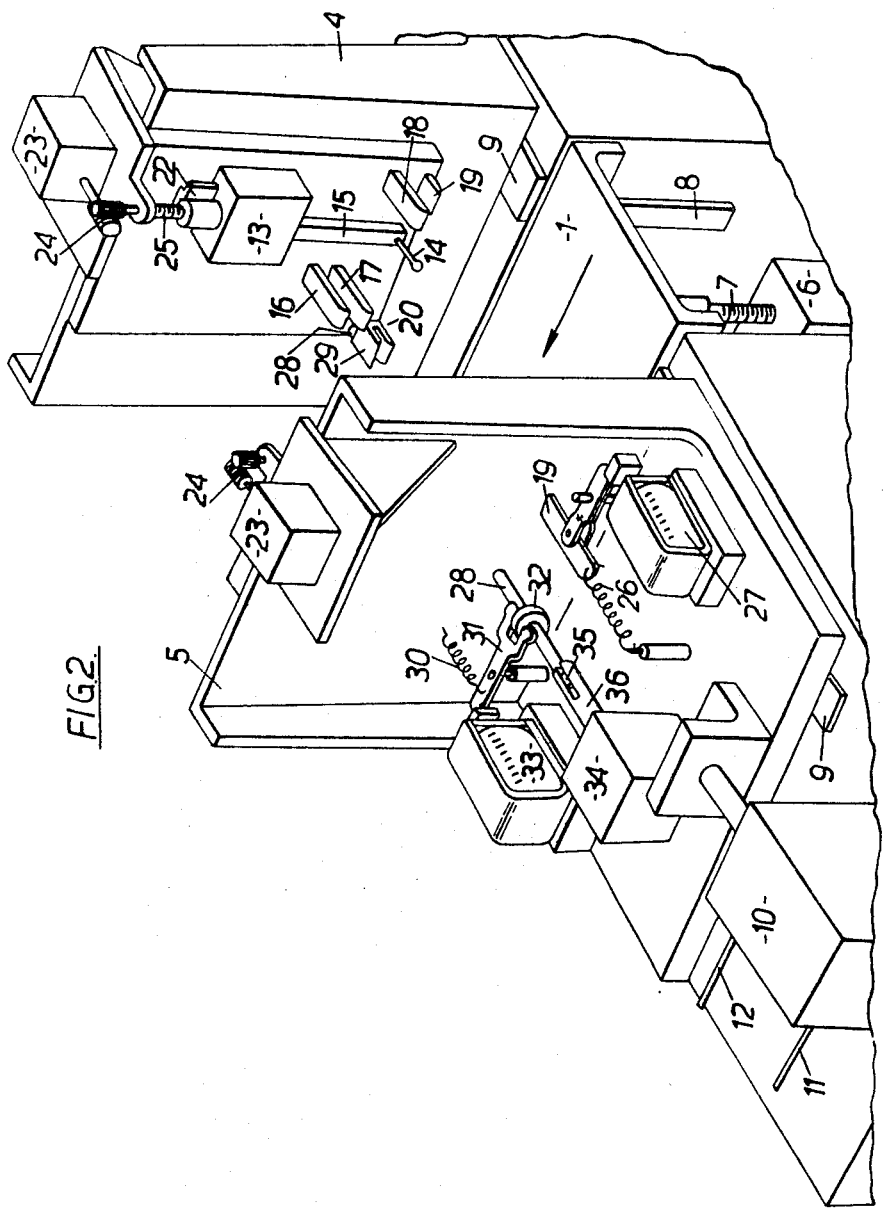
FIG. 2 is a perspective view of a relay spring measuring and adjusting machine.

Referring now to FIG. 2, there is shown a machine which automatically measures the spring pressures of the springs in a relay for use in telephone exchange equipment. After each measurement, the corresponding spring is adjusted to bring the spring pressure to within desired limits. The relay to be dealt with is of the type having a vertical pile-up of parallel cantilever springs on each side. The springs in each pile-up are separated vertically by a fixed spring pitch, or an integral multiple of this pitch, and each spring in one pile-up lies on the same lever as, or on a lever separated by an integral multiple of the spring pitch from a spring in the other pile-up. Thus each level can contain a spring in each pile-up, or only one spring, Each spring is assumed to be resting against a respective restraint, before measurement and adjustment, with a force greater than $F_1$.

The machine includes a table 1 on which the relay is firmly held accurately located, by means not shown, with reference to a fixed datum on the table. We prefer to mount the relay in a cradle, (not shown) and push the cradle in the direction of the arrow by one end manually or otherwise into position on the table so that the cycle of operation is automatically started when the relay is located without danger to the operator. When located, the springs in each pile-up run substantially parallel to the table, the free ends of the springs, i.e., the contact-bearing ends, facing in the opposite direction to the arrow.

The table 1 is movable from its upper position shown by means of a fixed motor 6 and lead screw 7. The table moves on guide rails 8. During operation the table is moved downward intermittently by amounts equal to the spring pitch so that successive springs in each pile-up can be dealt with, starting with the lowest spring.

Figure 3:
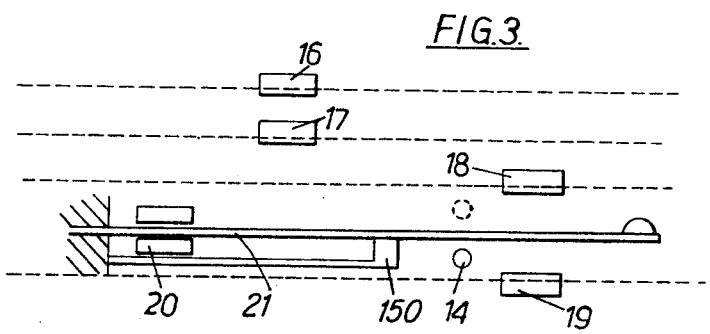
FIG. 3 shows the relative positions of the tools carried by the machine.

The heads 4 and 5, each of which operates on a separate one of the two pile-ups, are slideably mounted on rails 9 for movement towards or away from the table 1 at right angles to the springs of the relay. This movement is effected by respective air cylinders such as that shown at 10, the application of compressed air to the inlet 11 causing the head 5 to move towards the table 1, and the application of compressed air to the inlet 12 causing the head to move away from the table, The movement of the heads in either direction is limited by stops not shown and, during operation the heads move towards the table (or close) together or singly to engage the relay, and move away from the table (or open) so that the table can be lowered or the relay removed. Each head carries a transducer contained in a housing 13, a horizontal probe 14 carried by the transducer by means of a bar 15, fixed spring deflectors 16, 17 and 18, a retractible spring deflector 19, and a spring adjuster 20. FIG. 3 shows the positions of these various tools with respect to the spring 21 and restraint 150 being dealt with. The broken lines indicate the approximate positions of the springs, if any, lying above and below the spring 21.

The functions of the tools carried by the heads will now be described, it being understood that the head 5 carries identical tools in a mirror image arrangement to those carried by head 4.

Probe and transducer

When the heads close, each probe 14 is thereby inserted into the pile-up immediately above or below the spring to be dealt with (see FIG. 3), depending on whether that spring must be deflected down or up respectively to cause it to leave its restraint. In the case of a relay for use in telephone exchange equipment, the restraint is usually a buffer block or another spring. The probe can be moved up or down, i.e., in the direction perpendicular to the table, at constant speed by means of a motor 23 which via a worm drive 24 and lead screw 25 can raise or lower the transducer housing 13 on a guide rail 22.

Spring deflectors

It is important that when making the measurement of spring pressure, the spring is resting against its restraint free from the pressure of other springs in the pile-up, except of course in the case of a spring having another spring as its sole restraint.

To enable the functioning of the deflectors to be understood the types of spring which are catered to are now discussed.

Make buffer

A spring resting on the buffer block of the relay with a specified pressure. It is lifted from the buffer block by the lever spring when the relay is operated.

Break buffer

A spring which rests against the buffer block (when the relay is in the operated condition) with a specified pressure. It is lifted from the buffer block by the lever spring when the relay is in the unoperated condition.

Make lever

A spring moved by the armature which makes contact with a make buffer when the relay is operated. The make lever spring sits on the armature stud or the lever spring below it with a specified pressure.

Break lever

A spring, moved by the armature which breaks contact with a break buffer when the relay is operated. It may also, in the case of a changeover unit, make with a make buffer. The break lever sits on the armature stud or on the lever spring below it with a specified pressure.

K unit

This consists of 3 springs and functions with a make-before-break action as the relay operates. It consists of a bent buffer spring which remains in contact with the buffer block at all times with a minimum specified pressure. A second spring rests against the bent buffer with a specified pressure when the relay is inoperative. The spring is lifted off the bent buffer by the K lever when the relay is operated. The K lever spring is similar to, but shorter than, a make lever.

Since lever springs rest on lever springs below, it is necessary to raise up all the lever springs above the one being measured. This is done with fixed deflectors 16 and 17 which engage the springs as the machine heads close around the relay.

The spring pressure of a break buffer can be measured only when the relay is in the operative state. However, to avoid the need to operate the armature, either electrically or mechanically, the lever spring is lifted by a fixed deflector 18. This also enables a break spring on one side to be adjusted while a make spring on the other side is being adjusted which would not be possible if the armature were operated.

All the fixed deflectors will of course, engage with springs every time and if the spring engaged is not a lever spring it will have the effect of deflecting it slightly. This will cause no damage to the spring.

Each head also carries a movable deflector 19 which is normally partially retracted into the head to bear against a fixed stop (not shown) by a spring 26. The deflector can be inserted into the respective pile-up when necessary be energizing solenoid 27, to engage with a break buffer spring and lower it away from the break lever spring when a break lever spring is being adjusted. It is also engaged when a K lever spring is adjusted to lower the bent K buffer spring out of the way.

Deflectors 18 and 19 are positioned nearer the free ends of the springs so as not to interfere with the adjustment of the spring being dealt with.

Spring adjuster

The spring adjuster 20, hereinafter referred to as a twister, carried by each head includes a rod 28 which passes through the respective head and is mounted for both rotation and axial movement therein. The rod 28 carries a bifurcated member 29 positioned so that the tines are respectively at levels just above and just below the level of the spring to be dealt with adjacent its root, i.e., in a relay of the type concerned adjacent the insulating spacers between which the end of the spring is clamped. The member 29 is given a certain amount of float to allow for manufacturing tolerances on the relay.

While the spring pressure is being measured, the twister is held retracted from the pile-up by a spring 30 acting via a pivoted member 31 on a collar 32 fixed to the rod 28. When measurement has been completed the twister is inserted into the pile-up by energization of the solenoid 33. The tines then become positioned respectively above and below the spring to be adjusted. To adjust the spring the twister can be rotated clockwise or counterclockwise through a small angle by means of the stepping motor and reduction gearing 34 whose output drive 36 is coupled to the rod 28 by the axially slidable coupling 35. After twisting the spring, the twister is returned through an equal angle to its starting position.

The tines of the member 29 are offset to lie wholly to that side of the axis of the rod 28 away from the root of the spring and are symmetrical about a radius. Hence rotation of the twister bends the spring in the direction of twist to give it a permanent set, but does not kink it.

Figure 5:
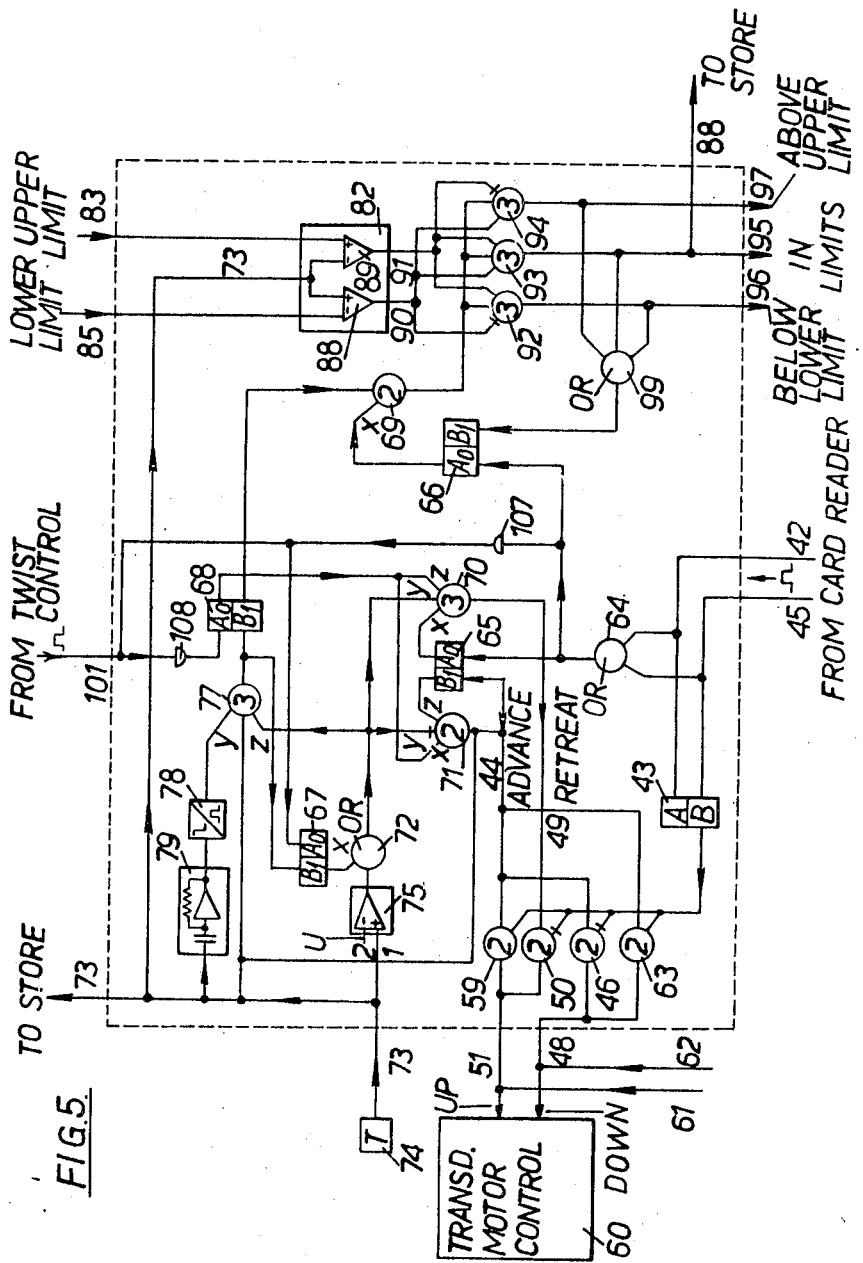
FIG. 5 is a logic circuit corresponding to part of FIG. 4 for the automatic measurement of spring pressure.

This completes the description of the machine shown in FIGS. 2 and 3. The cycle of operation will now be described with reference to FIGS. 4 and 5. FIG. 4 is a block schematic of the control circuitry to be used in association with the machine of FIGS. 2 and 3 for its automatic functioning. FIG. 5 shows in greater detail the logic circuitry relating to the measuring function of the machine, and in FIG. 5 the components within the outer dashed lines are those enclosed by the dashed rectangle in FIG. 4.

FIG. 4 mainly shows the circuitry associated with the right-hand head 4, but it is to be understood that identical circuitry is provided for the left-hand head 5.

The cycle of operation is programmed by a punched card read by a card reader. The punched card has a number of columns each of which can simultaneously supervise the measurement and adjustment of two springs, one in each pile-up, then in position to be dealt with, although the sequence of events may and usually will differ for each of the two springs.

The sequence of events for the measurement and adjustment of any spring in either of the pile-ups will now be given, the cycle of operation for the whole pile-up being essentially a repeat of this sequence, with necessary modifications, for each spring.

The cycle of operations is divided into steps for convenience, but each step does not necessarily occur during a different interval of time. Reference to FIG. 5 will mainly be needed for step (7), and step (7) is subdivided so that the logical sequence of measurement can be more conveniently explained.

Starting with any spring in either pile-up in position, the sequence is as follows:

1. The card reader receives a signal 55 which tells it that a spring or springs are in position. The signal 55 can either originate from e.g., a microswitch which gives a signal 40 to the OR-gate 56 when the relay is initially located on the table 1 for measurement and adjustment of the first spring or springs, i.e., the spring or springs occupying the lowest level, or from the control unit 51 which gives a signal 54 to the OR-gate 56 when it completes the downward stepping of the table by one spring pitch. See step (12).

2. On receipt of the signal 55 the card reader proceeds to read the column of the card relating to the particular springs now to be dealt with. If there is no spring in one pile-up at this level, the subsequent steps are not applied to that side.

3. However, considering the side on which there is a spring, if this spring is a break buffer which must be depressed from its restraint the card reader gives an appropriate signal over line 57 on receipt of which the unit 47 moves the probe up to a predetermined position above the expected level of the spring by means of a signal on line 61 to the motor control 60. If the spring to be dealt with is a lever spring, make buffer, or the top spring of a K-unit, all of which must be raised from their restraint, the signal over line 57 will instruct the unit 47 to pass a signal over line 62 to the motor control to move the probe to a predetermined position below the expected level.

4. Next, if the spring to be dealt with is a K or break lever spring, a signal 44 causes energization of the solenoid 27 so that the deflector 19 projects from the head to its full extent so as to be inserted into the pile-up when the head is closed. The solenoid will of course never be energized when the spring to be dealt with is the lowest in the particular pile-up concerned.

5. Now one or both heads are closed, according to whether there is a spring in one or both of the pile-ups at this level, by a signal or signals over lines 58 and/or 53 which pass to the head in/out units 41. These control the supply of compressed air to the cylinders 10. As each head closes, it gives a signal 52, receipt of which tells the card reader to proceed.

6. Next the card reader sets the limits within which the value of the transducer output corresponding to the spring pressure must lie for the spring being dealt with. A signal over line 81 to the limit select unit 87 sets the lower limit, which is applied to the comparator 82 (FIG. 5) via line 83, and a signal over line 84 sets the upper limit, which is applied to the comparator over line 85. For any spring but a break lever the limits are set directly by the card reader. In the case of a break lever, which must be set to a spring pressure which is greater than that of its associated buffer spring by a predetermined amount, the card reader only directly sets the limits corresponding to the excess spring pressure of the break lever over its associated buffer spring. At the same time, over line 86, it instructs the store 80 to add its stored value, corresponding to the adjusted spring pressure of the associated buffer spring, to the limits set in the unit 87. The store 80 always stores the final value of the transducer output for each spring (see step 10), but this stored value is not used except when the next spring is a break lever spring.

7. Now, a logic 1 pulse is passed by the card reader to line 45 if the spring is one to be raised from its restraint, and to line 42 if the spring is one to be depressed. Referring now to FIG. 5 the following measuring cycle takes place:

a. Depending upon whether the logic 1 pulse was applied to line 42 or 45, the output from square B of bistable 43 will be 0 or 1 respectively. In the former case the "advance" line 44 will be connected through the gate 46 to the "motor down" line 48, and the "retreat" line 49 will be connected through the gate 50 to the "motor up" line 51. In the latter case the connections will be interchanged and made through the other pair of gates 59 and 63.

b. At the same time the OR-gate 64 will give a logic 1 pulse out, which is applied to the squares A of bistables 65 to 68. The bistables are initially in the states indicated in the lower right-hand side of the squares. These states correspond to the measuring circuit of FIG. 5 being in its "off" condition. The effect of the pulse from gate 64 is to cause a logic 1 to be applied to the input $x$ of gate 69 by bistable 66, logics 1 and 0 to be applied to the inputs $x$ and $z$ respectively of gates 70 and 71 respectively by bistable 65, a logic 1 to be applied to inputs $z$ and $x$ of gates 70 and 71 respectively by bistable 68, and a logic 0 to be applied to input $x$ of gate 72 by bistable 67. Delay elements 107 and 108 giving constant small delays are incorporated as shown, to ensure that the bistables 65, 67, 68 change state in that order. This eliminates the possibility of momentary spurious energization of the lead 44 or 49 which could upset the measuring cycle. These delays could be incorporated in the bistables 67 and 68.

c. The output of gate 72, which in the "off" condition of the circuit was maintained at logic 1 by bistable 67, remains at logic 1 or changes to logic 0 depending upon the output of the comparator 75. The comparator 75 is a known piece of apparatus including a differential amplifier arranged with two inputs 1 and 2 and such that it delivers an output voltage corresponding to logic 1 if input 1 exceeds input 2 and a voltage corresponding to logic 0 if input 2 exceeds input 1. It includes hysteresis so that it does not change the state of its output if the two inputs become equal but only when input 1 becomes greater or less than the other by a given margin M, small compared to the fixed value U applied to input 2. Thus the output of the comparator will be logic 1 if the value 73 is greater than (U+M) and logic 0 if the value 73 is less than (U−M). If the output 73 is between (U−M) and (U+M) the output of comparator will be logic 1 or 0 depending upon the previous history of the output 73. If the output of the comparator is at logic 0 step (f) follows immediately.

d. If the output of comparator 75 is logic 1 inputs $y$ of gates 70 and 71 are at logic 1 also. Thus all three inputs of gate 70 are now at logic 1 and its output on line 49 becomes logic 1. Thus the motor control 60 is instructed to move the transducer 74 up or down as the case may be to withdraw the probe from the spring.

e. When the output 73 of the transducer drops below the value (U−M) the output of comparator 75 and hence of gate 72 becomes logic 0. The output of gate 70 becomes logic 0 and the probe, moved by the motor 23 via the transducer housing, comes to a halt.

f. Since the output of comparator 75 is now at logic 0 the input $y$ of gate 71 is at logic 0. The input $x$ of gate 71 is at logic 1 as mentioned before. Therefore since the appropriate signals appear on two of the inputs of gate 71, its output on line 44 becomes logic 1 and the probe is advanced towards the spring. At the same time the output of the gate 71 is fed back to square B of bistable 65, whose output, and this input $z$ of gate 71, becomes logic 1. At the same time the input $x$ of gate 70 becomes logic 0. The output of gate 71 is also fed to the input $y$ of gate 77 which becomes logic 1.

g. As the probe advances at constant speed towards the spring the output 73 will exceed the value (U+M) corresponding to the force $F_1$, and the inputs $y$ to gates 70 and 71 will become logic 1. However, the motor will not be reversed since the input $x$ of gate 70 is at logic 0, but the logic 1 on input $z$ of gate 71 will maintain the output on line 44 at logic 1. Therefore the probe continues to advance. The output of gate 72, now at logic 1, is applied to the input $z$ of gate 77, which is now open for the passage of a signal from the one shot generator 78.

h. The rate of change of the transducer output 73 is continually monitored by the differentiating circuit 79 which gives an output proportional to this rate. The differentiator 79 is of known type consisting essentially of a computing amplifier having a feedback resistance R and being fed through a capacitor C. When the probe reaches the point C, FIG. 1, the rate of change of output alters abruptly from a higher value to a lower value. Thus the differentiator 79 generates a negative going step upon receipt of which the one shot generator 78 gives a logic 1 pulse. This pulse passes through the now open gate 77 to the input of square B of bistable 68. The output of square B now becomes logic 1 and the output of square A becomes logic 0.

i. The logic 1 pulse from gate 77 is also fed to square B of bistable 67, thus causing a logic 1 to be maintained at the input $x$ of gate 72.

j. Due to the output of square A of bistable 68 becoming logic 0, the inputs $x$ and $z$ of gates 71 and 72 respectively become logic 0. Thus the output of gate 71 becomes logic 0 since the input $y$ of this gate is at logic 1, the output of gate 70 remaining at logic 0. Thus the movement of the probe is halted, the value of the output 73 now corresponding to the spring pressure at the point concerned.

k. Due to the output of gate 71 becoming logic 0, the input $y$ of gate 77 becomes logic 0 thus closing the gate to the generator 78.

m. As mentioned in step (g) the output of square B of bistable 68 becomes logic 1, and since input $x$ of gate 69 is at logic 1, the output of gate 69 becomes logic 1.

n. A comparator 82 contains two differential amplifiers 88 and 89 each having an output lead 90 and 91 respectively. An output from the transducer T is fed to opposite inputs of the two amplifiers. The other inputs to the amplifiers are voltages selected to correspond respectively to the prescribed upper and lower limits of spring pressure required. Logic 1 appears on lead 91 when the output from the transducer is less than the voltage corresponding to the prescribed upper limit of spring pressure. Similarly lead 90 carries logic 1 when the output from transducer T is above the voltage corresponding to the prescribed lower limit of spring pressure. Three gates 92, 93 and 94 are arranged to provide outputs which indicate respectively "below lower limit," "within limits," and "above upper limit." One of the inputs of both of the gates 92 and 94 is negated so that, to obtain an output from these two gates they must each have two inputs of logic 1 and one input of logic 0. Lead 91 feeds the negated input of gate 94, one of the inputs of gate 93 and one of the normal inputs of gate 92. Similarly lead 90 feeds one of the normal inputs of gate 94, one of the inputs of gate 93 and the negated input of gate 92. The third input to each of these gates is obtained from the output of gate 69. The connection from gate 69 ensures that there is no output from any of the gates 92, 93 and 94 unless the output from gate 69 is logic 1, which, as has been described above in step (n), occurs only after the transducer has raised the spring from off its restraint and the motor has stopped. In other words no signal is released until the prescribed conditions for measurement of spring pressures are attained.

p. If a logic 1 appears from the output of gate 93 on the line 95, steps (8) and (9) are missed. If a logic 1 appears from either of the other two gates 92 and 94, this signal is passed via line 96 or 97 respectively to the twister control unit 98. However, which ever of the lines 95 to 97 the logic 1 appears on, this will be passed through the OR-gate 99 to the input on the B square of bistable 66.

q. The output of the A square of bistable 66 will go to logic 0, causing the output of gate 69 to go to logic 0, thus changing the logic 1 to a logic 0 on the output of the appropriate one of the gates 92 to 94. Thus effectively the output on the lines 95 to 97 will be a short pulse, which can however be lengthened by a delayed finish element if necessary. The measuring circuit of FIG. 5 is now in its "off" condition.

8. On receipt of a signal over line 96 or 97 the control 98 first energizes solenoid 33 to insert the twister into the pile-up, then passes a signal 100 to step the motor 34 through a given number of steps in a direction determined by whether the measured value of the spring pressure was above or below limits. The probe does not greatly interfere with the adjustment since it is located near the free end of the spring. The transducer remains stationary during the abrupt changes of pressure on the probe during adjustment since the input $y$ to the gate 71 is kept at logic 1 by the bistable 67. The twister returns to its starting position, the solenoid 33 is deenergized.

9. A logic 1 pulse is then passed over line 101 to the bistables 65 to 68.

Steps 7(c) to 7(n) are now automatically repeated, and if the spring has been under or overadjusted, the control 98 restarts the motor, which is stepped through a slightly greater number of steps than before if the spring is underadjusted, and through a smaller number in the reverse direction if overadjusted. This step repeated until a logic 1 appears on the output of gate 93 indicating that the spring is within limits. If the spring cannot be adjusted, i.e., the twister motor steps through its maximum number of steps in the same direction twice in succession, the twist control gives a fault signal 102 which automatically opens the heads and returns the table to its starting position for removal of the relay.

10. The logic 1 pulse from gate 93 is passed over line 88 to the store 80, which then stores the final value of the transducer output 73.

11. The logic 1 pulse from gate 93 is also passed to the card reader via line 95, and on receipt of such a pulse from one or both sides, depending on whether one or two springs were adjusted at this level, the card reader opens one or both heads by a signal or signals over the lines 53 and/or 58.

12. Next the card reader passes either a signal 103 or a signal 104 to the unit 51. The signal 103 is applied to cause the unit 51 to step the table down one spring pitch by energization of motor 6 over line 105 for measurement of the next spring or springs. The sequence of events then repeats from step (1). The signal 104 is applied when the spring or springs just dealt with are on the highest level, i.e., the last to be adjusted, and causes the unit 51 to raise the table to its starting position when the relay can be removed.

This completes the description of the cycle of operation of the machine. It is clear that the machine can be modified to deal with relays in which the spring pitch of the two pile-ups is different, and in which the spacing of springs within each pile-up is different.

In such cases the probe, spring deflectors, and twister would be differently positioned on one head relative to the other head and possibly also of different dimensions. Also additional spring deflectors can be provided, which may be retractible, to deal with various spring spacings in a pile-up. In addition the table 1 would not be stepped by equal amounts between each adjustment, but would be programmed by the punched card to step to the level of the next spring, which could be on either side of the relay.

We have found that in many cases a simplification of the control circuitry of FIG. 5 can be made.

From measurements of the spring pressure of very many relay springs we have found that within any given relay pile-up all springs having the same corresponding function in the pile-up will yield force displacement curves in which the distance BC (FIG. 1) is the same. This enables the following procedure to be adopted during measurement.

After step 7(e) the probe is advanced towards the spring until the output of the transducer rises above the value (U+M), corresponding to force $F_1$. Thereafter the probe is moved a fixed distance $x$ to a point at which all springs of the particular type concerned would be clear of their restraint and at approximately the same position, close to C along the portion CD of the force displacement curve. The force then exerted on the probe can be taken to be that corresponding to the spring pressure to within an acceptable accuracy.

The logic circuit of FIG. 5 can be very simply modified to perform this sequence. The branch of the circuit containing the differentiator 79 and the one shot generator 78 is removed, making gate 77 a two-input AND gate, and a variable delayed start element introduced between the output of the gate 77 and the junction 106. When the probe is advancing towards the spring the input $y$ to gate 77 is logic 1. When the output of the transducer becomes greater than U, probe at point $d$ FIG. 1, the output of comparator 75 becomes logic 1 whereupon the input $z$ of gate 17 becomes logic 1. However the logic 1 output of gate 77 is not immediately applied to square B of binary 68, but is delayed by the delay element. The amount of the delay will have previously been set by the card reader to a value equal to the distance $x$ divided by the constant speed of the probe. Thus when the probe reaches $d$ the output of the delay becomes logic 1, whereupon the sequence of events is as described in steps 7(h) to 7(q). This simplified circuit is not used where greater accuracy is required.

We claim:

1. Apparatus for automatically measuring the force required to lift a sprung member from a restraint, comprising:
   a support head;
   a probe coupled to said support head;
   means coupled to said probe for moving the probe in a direction so as to press the sprung member from its restraint;
   sensing means coupled to said probe for determining that said sprung member has left its restraint,
   said sensing means including means for monitoring the rate of change of the force exerted on the probe in relation to its movement;
   measuring means for determining the force exerted on the probe by the sprung member; and
   generating means for providing a signal which is a function of the force exerted on the probe by the sprung member at the time said sprung member leaves its restraint.

2. Apparatus for automatically measuring the force required to lift a sprung member from a restraint, according to claim 1, wherein said sprung member is a cantilevered spring fixed at one end to a support and bearing against a restraint which prevents the sprung member from assuming an unrestrained neutral position.

3. Apparatus for automatically measuring the force required to lift a sprung member from a restraint, according to claim 2, wherein said signal can provide any one of three indications relating to the force required to separate the sprung member from its restraint, said indications being above limits, below limits or within limits.

4. Apparatus for automatically measuring the force required to lift a sprung member from a restraint, according to claim 2, further including means coupled to said support head for distorting the sprung member to adjust the force exerted on the probe.

5. Apparatus for automatically measuring the force required to lift a sprung member from a restraint, according to claim 2, wherein the sprung member to be affected is one of a group of parallel sprung members cantilevered one above the other, and further including deflectors connected to said support head arranged to deflect any sprung member which normally presses against the sprung member to be affected away from said last mentioned sprung member.

6. Apparatus for automatically measuring the force required to lift a sprung member from a restraint, according to claim 5, wherein said support head is movable towards or away from said group of parallel sprung members.

7. Apparatus for automatically measuring the force required to lift a sprung member, according to claim 6, wherein two groups of parallel sprung members are provided and said apparatus includes two support heads arranged so that one is on either side of said two groups of parallel sprung members.

8. Apparatus for automatically measuring the force required to lift a sprung member from a restraint, according to claim 1, wherein said sensing means further includes:
   means to detect when the force exerted on the probe exceeds a given value; and
   means for detecting the first discontinuity in said rate of change thereafter.

9. Apparatus for automatically measuring the force required to lift a sprung member from a restraint, according to claim 4, further including:
   means for moving the probe in a direction opposite to said direction if the force exerted on the probe exceeds said given value when the sprung member and the probe are initially positioned with respect to one another for measurement and for continuing the movement until the force is less than the given value.

10. Apparatus for automatically measuring the force required to lift a sprung member from a restraint, according to claim 1, wherein said sensing means further includes:
    means for detecting when the force exerted on said probe exceeds a given value; and
    means for moving the probe a further given distance thereafter.

11. Apparatus for automatically measuring the force required to lift a sprung member from a restraint, according to claim 1, wherein said measuring means further includes a transducer providing a voltage proportional to said force, said probe being coupled to said transducer.

12. Apparatus for automatically measuring the force required to lift a sprung member from a restraint, according to claim 9, wherein the means for monitoring the rate of change of the force exerted on the probe includes a time-differentiating circuit to which said voltage is provided while the probe is moved at a constant speed.

* * * * *